United States Patent [19]
Harrington

[11] 3,917,548
[45] Nov. 4, 1975

[54] PROCESS FOR THE SUSPENSION POLYMERIZATION OF POLYVINYL CHLORIDE

[75] Inventor: Charles L. Harrington, Newark, Del.

[73] Assignee: Stauffer Chemical Company, New York, N.Y.

[22] Filed: Dec. 14, 1970

[21] Appl. No.: 98,076

[52] U.S. Cl. ...... 260/17 A; 260/31.2 R; 260/78.5 R; 260/78.5 CL; 260/82.1 R; 260/85.5 XA; 260/86.3; 260/87.1; 260/87.5 R; 260/87.5 C; 260/87.7; 260/92.8 W
[51] Int. Cl. ...... C08f 15/02; C08f 15/30; C08f 3/30
[58] Field of Search ........ 260/92.8 W, 87.1, 87.5 R, 260/17 A

[56]  References Cited
UNITED STATES PATENTS

| | | | |
|---|---|---|---|
| 2,538,051 | 1/1951 | Schick | 260/92.8 W |
| 2,772,258 | 11/1956 | Manganlli | 260/92.8 W |
| 3,042,665 | 7/1962 | Jankowiak | 260/92.8 W |
| 3,161,623 | 12/1964 | Kühne | 260/92.8 W |
| 3,205,204 | 9/1965 | Heckmaier et al. | 260/92.8 W |
| 3,451,985 | 6/1969 | Mahlo | 260/92.8 W |
| 3,592,800 | 7/1971 | Oschmann et al. | 260/92.8 W |

Primary Examiner—Stanford M. Levin

[57] ABSTRACT

There is disclosed an improved process for the suspension polymerization of the homo- and copolymers of vinyl chloride involving the use, as a suspending agent, of methyl hydroxypropyl cellulose in combination with a polyvalent metal, anionic surfactant such as magnesium lauryl sulfate. The resulting polymers are characterized by their ability to absorb unusually high concentrations of plasticizers as well as by their excellent heat stability, desirable particle size distribution and high bulk densities.

4 Claims, No Drawings

PROCESS FOR THE SUSPENSION POLYMERIZATION OF POLYVINYL CHLORIDE

BACKGROUND OF THE INVENTION

Polyvinyl chloride and certain copolymers of vinyl chloride represent a highly versatile class of synthetic resins which can be processed by diverse methods into a wide variety of end products. In order to facilitate end-use processing, it is common commercial practice to custom design certain vinyl chloride resins for use in specific processing techniques. Such custom designing entails adjustment of the balance of the resins properties in order to emphasize or enhance those properties which are especially desirable for the intended use. As a consequence of this optimization procedure, certain properties will, on the other hand, be minimized or completely sacrificed.

For example, it is often highly desirable to maximize the ability of vinyl chloride resins to absorb and/or to adsorb plasticizers in order to permit their use in the preparation of certain end products such, for example, as flexible films and sheeting. Thus, the incorporation of a plasticizer into a vinyl chloride resins serves to increase its flexibility, workability or distensibility. Typical plasticizers are non-volatile organic liquids or low melting solids such as the phthalate, adipate, sebacate and aryl phosphate esters. In order to attain this goal of increased plasticizer capacity, it has in the past been the practice in the art to resort to the use of various procedures none of which, as will be seen, has proven to be completely satisfactory.

Thus, included among the techniques which have been utilized in order to attain vinyl chloride resins with high plasticizer capacity is the use of emulsion polymerization procedures rather than the far less costly suspension processes; the generation, in a suspension process, of very fine resin particles, entailing the inconvenient creation of dust and the elimination of the economically attractive option of the pneumatic bulk handling of such resins; and, the use of suspension polymerizations which are carried to economically unsatisfactory low degrees of monomer conversion. Moreover, many of these procedures result in drastic losses in the bulk density and heat stability of these high plasticizer capacity vinyl chloride resins.

It is, therefore, the prime object of this invention to prepare vinyl chloride resins having a high plasticizer capacity by means of a convenient, inexpensive process which permits the resulting resins to retain the desirable properties ordinarily found in conventional resins. It is a further object of this invention to prepare vinyl chloride resins suitable for the preparation of so called "dry blends" comprising blends of suspension sized vinyl chloride particles with various processing adjuncts such as stabilizers and plasticizers, such blends being prepared by the use of high shear mixing equipment. More particularly, it is the object of this invention to provide high plasticizer capacity vinyl chloride resins whose heat stability, bulk density and particle size distribution is comparable to that found in general purpose resins. Various other objects and advantages of this invention will be apparent from the disclosure which follows hereinafter.

TECHNICAL DISCLOSURE OF THE INVENTION

It has now been found that vinyl chloride resins exhibiting an outstanding ability to absorb and/or adsorb plasticizers can be conveniently and economically prepared by means of a suspension polymerization procedure which is conducted in the presence of methyl hydroxypropyl cellulose, as a water soluble suspending agent, and a polyvalent metal, anionic surfactant. Thus, the use of the latter polymerization procedure yields vinyl chloride homo- and copolymers characterized by their high capacity for plasticizers which is, surprisingly, achieved without reduction in their other physical properties, particularly their heat stability, bulk density and particle size distribution.

In greater detail, now, the novel process of this invention is carried out by first preparing a monomer charge comprising an aqueous suspension of vinyl chloride or of a mixture of vinyl chloride with a minor proportion of one more ethylenically unsaturated, i.e. vinyl, comonomers. Applicable comonomers may be selected from the group consisting of vinyl esters of carboxylic acids such, for example, as vinyl acetate, vinyl propionate and vinyl stearate; alpha-olefins such as ethylene, propylene and butylene; vinylidene halides such as vinylidene chloride; the $C_1$–$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated monocarboxylic-acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alpha-methyl styrene; nitriles of ethylenically unsaturated carboxylic acids such as acrylonitrile and methacrylonitrile; vinyl pyrrolidones such as N-vinyl-2-pyrrolidone, $C_1$–$C_{20}$ alkyl vinyl ethers such as methyl vinyl ether, ethyl vinyl ether and stearyl vinyl ether; dienes such as isoprene and butadiene; vinyl phosphonates such as bis(beta-chloroethyl) vinylphosphonate; and, glycidyl esters of acrylic methacrylic acid such as glycidyl acrylate and glycidyl methacrylate, etc.

In preparing the monomer charge, the vinyl chloride, with or without additional comonomers, is dispersed in water in a concentration from about 20 to 40% by weight. The methyl hydroxypropyl cellulose and the selected polyvalent methyl anionic surfactant may be present in the water prior to adding the monomer(s) or they may be introduced subsequently. The water soluble methyl hydroxypropyl cellulose suspending agent should have a viscosity of from about 10 to 400 cps with best results being obtained when it has a viscosity of about 50 cps as determined, at 20°C., with a 2%, by weight, aqueous solution of the polymer in a Ubbelohde Viscometer according to ASTM procedures D-1347-64 and D-2363-65T. The concentration of the methyl hydroxypropyl cellulose in the monomer charge should be from about 0.02 to 1.0%, as based on the total weight of the monomers with the use of a concentration of about 0.1% being preferred. Thus, it has been found that the use of suspending agents other than methyl hydroxypropyl cellulose is unsatisfactory since such usage causes either: (1) an unsatisfactory "weakness" in the suspending system which results in substantial "plate-out" of polymer on the surfaces of the reaction vessel or in a total coalescence of the reaction mass or (2) requires the use of undesirably high concentrations of the suspending agent which impair the polymerization by causing foaming and which results in resins displaying inferior properties such as poor heat stability. Accordingly, even the use of closely related suspending agents such as taught in the U.S. Pat. No. 3,205,204 is not completely satisfactory since, as will subsequently be demonstrated, the use of such cellulose ethers in conjunction with polyvalent metal anionic surfactants as required in the process of this invention appears to produce suspending systems lacking sufficient "strength" to prevent partial or complete coalescence of the polymerization mass.

With respect to the required polyvalent metal, anionic surfactants, these may be selected from the group consisting of the di- and trivalent metal salts, including the magnesium, aluminum, cadmium and zinc salts of: the higher fatty alcohol sulfates, the alkyl aryl sulfonates; the higher alkyl sulfosuccinates and the alkylarylpolyethoxyethanol sulfates and sulfonates. However, from this group it is preferred to use the polyvalent metal salts of the higher fatty alcohol sulfates and particularly magnesium lauryl sulfate since it is an inexpensive commercially available product.

The function of these surfactants in the process of this invention is to act as an adjunct to the specified cellulose ether suspending agent in such a manner as to produce a coordinated suspending system capable of producing polymers which are significantly improved in their various properties as compared with the polymers obtained using only the cellulose either in the reaction system.

The selected surfactant should be present in the monomer charge in a concentration of from about 0.005 to 1.00%, as based on the total weight of the monomers with the use of a concentration of about 0.05% being preferred. The presence of one of the members of the above designated class of surfactants in the process of this invention has been found to be quite critical for its success. Thus, for example, if a monovalent metal, anionic surfactant such as sodium lauryl sulfate, as taught in U.S. Pat. No. 3,042,665, is utilized without the supplementary source of polyvalent metal ions whose use is required in the process taught by that patent, the resulting polymers will contain a substantial concentration of fines and will have only a limited ability to absorb and/or adsorb plasticizers.

Also required to be present in the monomer charge is a monomer soluble, i.e. an oil-soluble, catalyst or free radical initiator which may be an azo or peroxy compound such, for example, as azobisisobutyronitrile, t-butyl pivalate; lauroyl or caproyl peroxide, benzoyl peroxide or an aryl or alkyl peroxydicarbonate such as isopropylperoxy dicarbonate. The selected initiator will be dependent upon the molecular weight which is desired in the resulting polymer. Thus, the latter property is largely determined by the reaction temperature in the system which is, in turn, controlled by the particular initiator that is utilized. The selected catalyst should be present in a concentration of from about 0.01 to 0.5%, by weight, of the vinyl chloride or of the mixture of vinyl chloride with one or more comonomers.

The reaction is preferably conducted in a pressure vessel equipped with means for applying mechanical agitation which is necessary in order to produce and maintain the desired suspension of the monomer charge and of the resulting vinyl chloride homo- or copolymer. The vessel should also, preferably, be equipped with suitable heat removal equipment which is capable of controlling the temperature of the highly exothermic reaction.

Polymerization is initiated by heating the above described recipe at a temperature in the range of from about 20 to 70°C. for a period of from about 4 to 12 hours with agitation being applied throughout the course of the reaction. The reaction will, ordinarily, be terminated upon a drop in the reaction pressure of from about 5 to 50 psi under conditions where the temperature is being maintained at a constant level, or, upon requiring an increase in the reaction temperature in order to maintain a constant pressure, or as determined by digital calculations based upon heat balance data.

The resulting polymer suspension will ordinarily contain about 17 to 45%, by weight, of vinyl chloride resin solids having a particle size distribution such that about 90 to 98%, by weight, is in the range of from about 50 to 120 microns indicating that they are essentially devoid of fine and coarse fractions. These polymer solids have a bulk density of at least about 0.35 g/cm$^3$ as determined, for example, by means of ASTM D-1895. Their excellent capacity to absorb and/or adsorb plasticizers is indicated by the fact that when prepared so as to have a medium or high molecular weight, i.e. polymers with a solution Inherent Viscosity greater than about 0.65 as determined by ASTM D-1243, method A, they will take up at least 140 phr of plasticizer as measured by ASTM D-1755. This compares with a plasticizer take up of only about 90 phr for most general purpose vinyl chloride resins in the same molecular weight range. With lower molecular weight resins, i.e. those with an Inherent Viscosity of about 0.50, the process of this invention can yield products having a take up of about 120 phr of plasticizer as compared with a take up of about 70 phr of plasticizer for general purpose resins of a comparable molecular weight range.

The heat stability is quite exceptional for this type of resins. Moreover, an additional advantage of these resins is their substantial freedom from gel particles or fisheyes. This results from the uniform, physically "soft" nature of the particles resulting from the process of this invention as well as from their remarkable freedom from fines.

The resins resulting from the process of this invention may be utilized in a wide variety of end-use applications. Their high plasticizer capacity makes them particularly suitable for use in the preparation of flexible films which may be extruded or blown. Their ability to rapidly produce free-flowing dry-blends at high plasticizer levels makes them especially suitable for use in extrusion equipment for the processing of blends of this type. Other applications include their use in preparing extruded and shaped articles such as panels, sheets, tubes, rods and fibers and in carrying out such processes as injection molding, fluidized bed coating, electrostatic powder spraying and rotational coating, etc. In effect, these resins may be utilized in any of the coating, impregnating and molding procedures known to those skilled in the art.

Moreover, subsequent to their preparation, one may incorporate various optional additives into the novel vinyl chloride resin compositions of this invention. Such optional additives may, as already noted, include plasticizers such as the alkyl esters of phthalic, adipic and sebacic acids such, for example, as diphenyl, 2- ethylhexyl and tricresyl phosphate, etc.; lubricants and mold release agents such as stearic acid or its metal salts, petroleum based waxes, mineral oils, polyethylene waxes, etc.; heat and light stabilizers such as barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, benzophenones and benzotriazoles; fillers, pigments, dyes opacifying agents, decorative additives such as reflective metal foils or flakes, and other imbedded solid objects such as fiber glass, textile fibers, asbestos, paper and the like; flame retardants including antimony compounds such as antimony trioxide, halogenated alkyl phosphates or phosphonates, alkyl acid phosphates, or small concentrations of phosphoric acid, etc.

For a more complete listing of plasticizers, lubricants, stabilizers and other functional additives, one may consult "Polyvinyl Chloride" by H. A. Sarvetnick published by Van Nostrand Reinhold Co., New York, N.Y. in 1969.

The following examples will further illustrate the embodiment of this invention. In these examples, all parts given are by weight unless otherwise noted.

EXAMPLE I

This example illustrates the preparation of a high plasticizer capacity 97:3 vinyl chloride:vinyl acetate copolymer by means of the novel process of this invention.

The following ingredients are charged into a ten gallon stirred autoclave:

| | |
|---|---|
| Demineralized water | 50 lbs. |
| Hydroxypropyl methyl cellulose (Viscosity=50 cps) | 6 grams |
| Magnesium lauryl sulfate | 15 grams (a 27% active solution) |
| Vinyl chloride | 21¼lbs. |
| Vinyl acetate | 298 grams |
| Isopropyl peroxydicarbonate | 3.0 grams (in 20 gms. of toluene) |

Air is evacuated from the vessel, rapid agitation is applied and the temperature of the reaction medium is adjusted to and maintained at 123.5°F. until an overall decrease in reaction pressure of about 20 psi is observed. At this time, the reaction is terminated and residual monomers are vented off. The resulting polymer is recovered from the aqueous suspension by filtration and is air-dried.

The polymer is characterized by its excellent plasticizer capacity, bulk density, heat stability and particle size distribution. Thus, its plasticizer sorption, as determined by ASTM D-1755, is 165 phr. Its particle size distribution, as determined by ASTM D-1921, Method B, is such that zero percent is retained on 40 mesh and only 2 percent passes through 200 mesh. And, its bulk density, as determined by ASTM D-1895, is 0.36 gms/cm³.

EXAMPLE II

This example illustrates the preparation of a high plasticizer capacity vinyl chloride homopolymer by means of the novel process of this invention.

The following ingredients are charged into a 10 gallon stirred autoclave:

| | |
|---|---|
| Vinyl chloride | 25.5 lbs. |
| Demineralized water | 46½lbs. |
| Hydroxypropyl methyl cellulose (Viscosity=50 cps) | 10 grams |
| Magnesium lauryl sulfate | 10 grams(of a 27% solution) |
| Isopropyl peroxydicarbonate | 5.0 grams (in 20.0 grams of toluene) |

Air is evacuated from the reaction kettle and vigorous agitation is applied. The temperature is adjusted to and held at 115°F. until a reaction pressure decrease of about 5 psi is observed. At that time, the reaction is terminated and residual monomer is vented off. The resultant polymer is collected from the aqueous medium by filtration and is air-dried.

The polymer is characterized by its excellent plasticizer capacity, heat stability, bulk density and particle size distribution. Thus, its plasticizer sorption, as determined by ASTM D-1755, is 160 phr. Its particle size distribution, as determined by ASTM D-1921, Method B, is such that zero percent is retained on 40 mesh and only 4 percent passes through 200 mesh. And, its bulk density, as determined by ASTM D-1895, is 0.40 gm/cm³.

EXAMPLE III

This example illustrates the criticality inherent in the use of a polyvalent metal, anionic surfactant in the novel polymerization process of this invention.

The following ingredients are charged into identical 4,000 gallon autoclaves:

| | Reaction A | Reaction B |
|---|---|---|
| Demineralized water | 22,300 lbs. | 22,300 |
| Hydroxy propyl methyl cellulose (Viscosity=35 cps) | 12 lbs. | 12 lbs. |
| Magnesium lauryl sulfate (27% aqueous solution) | None | 18 lbs. |
| Sodium lauryl sulfate (27% aqueous solution) | 18 lbs. | None |
| Vinyl chloride | 4,800 lbs. | 4,800 lbs. |
| Trichloroethylene | 200 lbs. | 200 lbs. |
| Azobisisobutyronitrile | 2.5 lbs. | 2.5 lbs. |

Air is evacuated from each of the autoclaves and vigorous agitation is applied. The reaction temperature is then adjusted to and held at 160°F. for about five hours, at which time a 5 psi decrease in the reaction pressure is observed. About 8,000 pounds of polymer is, in each case, separated from the aqueous phase and dried. The two resulting products are found to possess the following properties:

| | Polymer from Reaction A | Polymer from Reaction B |
|---|---|---|
| Inherent Viscosity (ASTM D-1243, Method A) | 0.49 | 0.50 |
| Bulk Density (ASTM D-1895)gm/cm³ | 0.520 | 0.458 |
| Plasticizer Sorption (ASTM D-1755) phr | 92 | 120 |
| Particle Size Analysis (ASTM D-1921 Method B) | | |
| % on 40 Mesh | 0 | 0 |
| % passing 200 mesh | 51 | 2 |

The above data makes it quite clear that the polymer resulting from the process of this invention, i.e. the polymer from Reaction B, in which a polyvalent metal anionic surfactant is utilized is far superior in its properties to the polymer of Reaction A in which a monovalent metal, anionic surfactant is utilized.

EXAMPLE IV

This example illustrates the criticality inherent in the use of methyl hydroxypropyl cellulose in the novel polymerization process of this invention.

The following ingredients are charged into identical 10 gallon autoclaves:

|  | FORMULATION | | | |
|---|---|---|---|---|
|  | A | B | C | D |
| Demineralized water | 50 lbs. | 50 lbs. | 50 lbs. | 50 lbs. |
| Magnesium lauryl sulfate (27% aqueous solution) | 15 gms. | 15 gms. | 15 gms. | 15 gms. |
| Isopropyl peroxydicarbonate (in 20 gms toluene) | 3.0 gms. | 3.0 gms. | 3.0 gms. | 3.0 gms. |
| Vinyl chloride | 21⅛ lbs. | 21⅛ lbs. | 21⅛ lbs. | 21⅛ lbs. |
| Vinyl acetate | 298 gms. | 298 gms. | 298 gms. | 298 gms. |
| Hydroxypropymethyl-cellulose | 6 gms | None | None | None |
| Hydroxyethyl cellulose | None | 6 gms. | None | None |
| Methyl cellulose | None | None | None | 6 gms. |
| Hydroxypropyl cellulose | None | None | 6 gms. | None |

Air is evacuated from each reactor and vigorous agitation is applied. The reaction temperature is maintained at 123.5°F. The reactions are terminated at a 20 psi pressure drop or upon observing evidence of extreme suspension failure, e.g. inability to control reaction temperature because of polymer coalescence on the reaction vessel heat transfer surfaces. The reaction of Formuation A yields a polymer similar in its properties to those described for the product of Example I hereinabove. However, each of the reactions involving Formulations B, C, and D result, in each case, in severe agglomeration of virtually the entire polymer product produced which necessitates its manual removal from the respective reaction vessels with chisels and related hand tools. These results clearly demonstrate the need for using methyl hydroxypropyl cellulose as the suspending agent in the process of this invention.

Variations may be made in proportions, procedures and materials without departing from the scope of this invention as defined in the following claims.

What is claimed is:

1. A polymer selected from the group consisting of polyvinyl chloride and the copolymers of vinyl chloride with a minor proportion of at least one vinyl comonomer, said polymer having the following characteristics:
    a. a plasticizer capacity of at least 120 phr as determined by ASTM D-1755;
    b. a bulk density of at least about 0.35 gm/cm$^3$; and,
    c. a particle size distribution such that at least about 90 to 98%, by weight, is in the range of from about 50 to 120 microns.

2. Polyvinyl chloride according to claim 1.

3. A copolymer of vinyl chloride and a minor proportion of at least one vinyl comonomer according to claim 1.

4. A copolymer of vinyl chloride and a minor proportion of vinyl acetate according to claim 3.

* * * * *